United States Patent [19]

Koontz

[11] Patent Number: 4,902,875
[45] Date of Patent: Feb. 20, 1990

[54] POWER DISCONTINUITY SENSOR FOR A DUAL FEED HEATABLE WINDSHIELD

[75] Inventor: Harold S. Koontz, Pittsburgh, Pa.

[73] Assignee: PPG Industries, Inc., Pittsburgh, Pa.

[21] Appl. No.: 267,402

[22] Filed: Nov. 4, 1988

[51] Int. Cl.$^4$ .............................................. B60L 1/02
[52] U.S. Cl. ..................................... 219/203; 219/522
[58] Field of Search ................ 219/203, 202, 509, 522

[56] References Cited

U.S. PATENT DOCUMENTS

| | | | |
|---|---|---|---|
| 3,379,859 | 5/1966 | Marriott | 219/522 |
| 3,526,753 | 12/1966 | Aisanich et al. | 219/522 |
| 3,760,157 | 9/1973 | Newman et al. | 219/202 |
| 3,800,121 | 3/1974 | Dean et al. | 219/202 |
| 3,876,862 | 4/1975 | Newman et al. | 219/509 |
| 3,892,947 | 7/1975 | Strengholt | 219/522 |
| 4,057,671 | 11/1977 | Shoop | 219/203 X |
| 4,078,107 | 3/1978 | Bitterice et al. | 219/203 X |
| 4,323,726 | 4/1982 | Criss et al. | 219/522 X |
| 4,543,466 | 9/1985 | Ramus | 219/203 |
| 4,565,919 | 1/1986 | Bitter et al. | 219/203 X |
| 4,610,771 | 9/1986 | Gillery | 204/192.1 |
| 4,668,270 | 5/1987 | Ramus | 219/203 X |
| 4,808,799 | 2/1989 | Schave | 219/522 |
| 4,829,163 | 5/1989 | Rausch et al. | 219/522 X |

*Primary Examiner*—C. L. Albritton
*Attorney, Agent, or Firm*—Andrew C. Siminerio

[57] ABSTRACT

A power discontinuity sensor for a heatable windshield with bus bars having a double lead configuration. Sensor lines extend around the perimeter of the windshield in close proximity to adjacent bus bars or leads. The sensor lines are provided with current from an upper bus bar through a connecting bridge along the upper bus bar. Voltage in the sensor lines is monitored and current to the bus bars is interrupted in response to predetermined variations in the measured voltage.

20 Claims, 4 Drawing Sheets

POWER DISCONTINUITY SENSOR FOR A DUAL FEED HEATABLE WINDSHIELD

BACKGROUND OF THE INVENTION

1. Field of the Invention

This invention relates to a power discontinuity sensor in an electrically heatable transparency and in particular to a sensor useable with a heatable windshield having a double feed electrical input configuration to a pair of bus bars that will interrupt electrical power to the bus bars when a break is sensed in the bus bar feeds of the windshield that will cause arcing and additional damage to the heatable windshield.

2A. Technical Considerations

It has been known to pass electric current through a bus bar and transparent conductive coating to another bus bar on the surface of a transparency to raise its temperature. A double feed heated transparency, and in particular a windshield, includes first and second bus bars each positioned along opposite edges of the windshield to be heated. Power is provided to at least one of the bus bars by dual leads, each attached to opposite ends of the bus bar. In this fashion, if one of the leads fails, the other can still supply power to the bus bar and maintain the windshield's operation.

One mode of failure of heatable transparencies is overheating of the bus bars which results from arcing when current moves through a defective bus bar. As a result of the arcing, there is a localized area of high temperature that will overheat the windshield. In the instance where the transparency is a laminated windshield, the overheating caused by arcing can damage the plastic interlayer or in severe cases damage the laminated transparency thus adversely affecting its occupant retention capability.

In heatable windshield configurations having single power leads to each bus bar, it has been suggested to detect power discontinuities in the bus bar system by using a sensor lead that either extends along the single power lead and contacts the bus bar system at the juncture between the power lead and bus bar, or a sensor lead that extends along both the bus bar and single power lead and contacts the bus bar system at the free end of the bus bar.

It would be advantageous to have the capability of detecting defects in the bus bars and/or leads of a double feed heatable windshield which may result in overheating and interrupting current flow to the bus bars before the windshield is permanently damaged while maintaining the windshield's ability to continue operation if only one of the two power feed leads is broken.

2B. Patents of Interest

U.S. Pat. No. 3,892,947 to Strengholt teaches an electrically heated panel with anti-shock conductive strips. The electric current conductive strip extends around the periphery of the panel before contacting any portion of an electrically conductive coating on the panel surface. A single break or fracture in the strip will prevent any current from flowing through the coating.

U.S. Pat. Nos. 4,057,671 to Shoop, 4,323,726 to Criss et al., and 4,543,466 and 4,668,270 to Ramus teach a heated laminated window with an electroconductive coating or a wire grid extending between a pair of spaced bus bars. Current passes from one bus bar, through the coating or wire grid, to the opposite bus bar to heat the window.

U.S. Pat. No. 4,565,919 to Bitter et al. teaches a crack detector for an electrically conductive windshield. The circuit includes a sensor arrangement for monitoring the resistance of the conductive film of the windshield and interrupting power applied to the film when the resistance assumes a value indicative of element cracking.

SUMMARY OF THE INVENTION

The present invention provides a sensor usable with a double feed heatable windshield. A double feed heatable windshield provides two power leads to its upper bus bar. As a result, if one of the leads fail, power can still be supplied to the upper bus bar through the remaining lead and the windshield remains functional. The present invention allows the windshield to continue operation under such conditions but will detect a condition wherein both leads have failed and localized overheating of the windshield can occur due to arcing. This is achieved by providing a sensor including a sensor filament electrically interconnected to the upper bus bar and double feed configuration downstream from those portions of the bus bar and feeds to be monitored. In one particular embodiment of the invention, the sensor filament is a wire member embedded in an interlayer ply of the windshield and is electrically interconnected to the upper bus bar by a metal connector extending through the interlayer. Current is supplied to the sensor filament from the upper bus bar through the connector to provide two electroconductive paths to power the sensor line. The voltage from the sensor filament is monitored and compared to a reference level voltage. When both leads fail so that power to the sensor filament is reduced, the measured voltage drops. This change in voltage is detected and the power to the windshield bus bars is interrupted.

In another embodiment of the invention, the sensor includes a pair of sensor lines each extending along a lead and electrically interconnected with the upper bus bar or the adjacent lead. The sensor lines may also extend along the upper bus bar and be interconnected to form a single sensor line about the perimeter of the windshield adjacent the bus bars and leads. The single sensor line is connected to the upper bus bar to power the sensor.

DETAILED DESCRIPTION OF THE DRAWINGS

DETAILED DESCRIPTION OF THE INVENTION

The present invention is described in combination with a laminated transparency comprised of two plies of glass bonded together by an interlayer of plastic, and in particular a windshield, but as can be appreciated by those skilled in the art the present invention may be incorporated into any type of heatable transparency where the temperature of the transparency is monitored.

Figure 1:
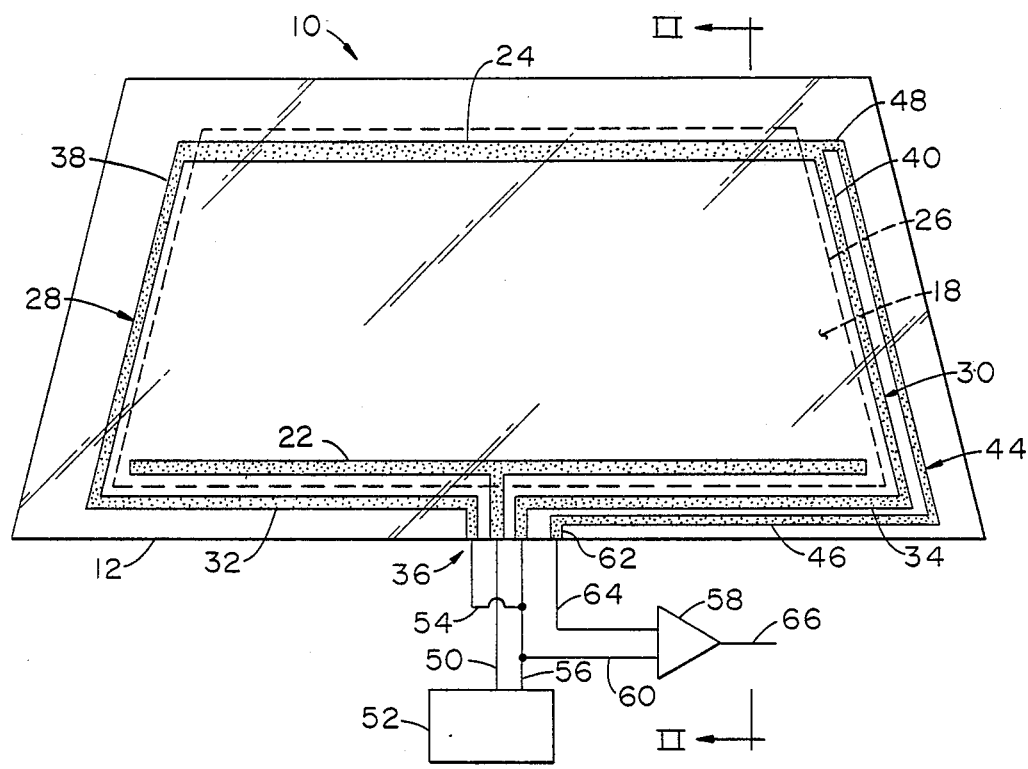
FIG. 1 is a schematic view of a heatable windshield incorporating features of the present invention.
Figure 2:
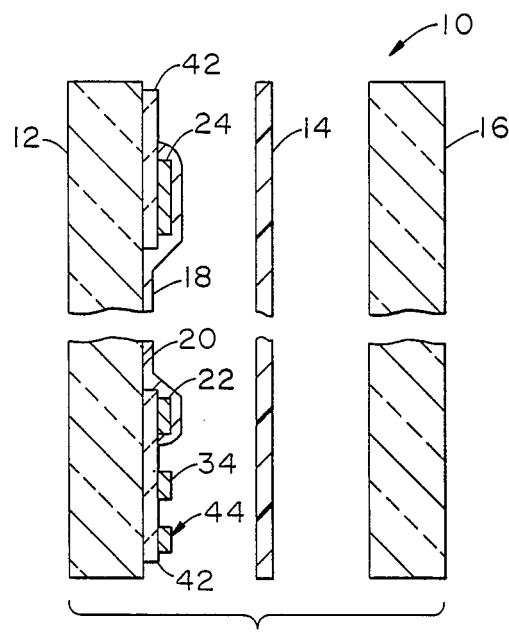
FIG. 2 is an exploded cross-sectional view taken along line II—II of FIG. 1.

The present invention teaches a sensor for a double feed heatable windshield that allows the windshield to remain operational when only one lead is defective but will interrupt power to the bus bars when it senses that both leads are defective. Referring to FIGS. 1 and 2, the transparency 10 includes an outboard glass ply 12, i.e. the ply furthest from the vehicle interior, a plastic interlayer 14 (shown only in FIG. 2) which may be polyvinylbutyral as is commonly used for laminated windshields, and an inboard glass ply 16 shown only in FIG. 2). A heating arrangement is provided to heat the transparency 10. Although not limiting in the present invention, in the preferred embodiment of the invention the heating arrangement includes an electroconductive coating 18 preferably positioned on the inside surface 20 of the outboard glass ply 12. Various coatings may exhibit the necessary combination of transparency and electroconductivity required to serve as the heating element for the transparency 10, but a preferred coating is similar to that disclosed in U.S. Pat. No. 4,610,771 to Gillery, which teachings are hereby incorporated by reference. The coating comprises a silver film between a pair of zinc stannate films with a copper primer between the films, each of which may be applied sequentially by magnetron sputtering. The silver acts as an electroconductive layer and the zinc stannate films serve to mask the reflectance of the silver. In a preferred embodiment of the invention, the coating exhibits an approximate resistivity of about 7 to 8 ohms per square when the silver layer has a thickness of about 110 angstroms.

A bottom bus bar 22 and top bus bar 24 are positioned on the glass ply 12 to be in contact with the coating 18 as shown in FIGS. 1 and 2. Line 26 indicates an edge of the coating 18 spaced from edges of the transparency 10. The uncoated marginal areas may be provided by masking these selected portions of the transparency 10 during the coating process. Optionally, the entire glass sheet could be coated and the coating subsequently deleted from those areas. The uncoated marginal areas permit electrical connections to be made to the upper bus bar 24 without contacting the coating 18 or the bottom bus bar 22. The connection to the upper bus bar 24 of the windshield 10 includes a pair of leads 28 and 30 having conductive strips 32 and 34, respectively, extending in opposite directions along the bottom edge of the windshield 10 from the terminal area 36 and conductive side strips 38 and 40 extending along opposite side portions which connect strips 32 and 34, respectively, to opposite ends of upper bus bar 24. With this double feed configuration, power is supplied to both ends of the upper bus bar 24 resulting in a more even power distribution across the length of the bus bar 24 and through the electroconductive coating 18. In addition, a break in one lead will not terminate all power to the upper bus bar 24 but rather the power can be supplied through the remaining lead. As shown in FIG. 1, the strips 32, 34, 38, and 40 all are positioned within the uncoated, marginal area of the windshield 10. Although not limiting in the present invention, the electrical connections to the bottom bus bar 22 and to the top bus bar 24 via leads 28 and 30 are preferably made along the bottom edge of the windshield 10 at terminal 36 as illustrated in FIG. 1 but it should be appreciated that the connections may be made anywhere about the perimeter of the windshield 10.

The bus bars and conductive strips are preferably made of a silver containing ceramic frit material, as is well known in the art, and may be applied in any convenient manner, e.g. silk screened onto the glass surface 20 of the glass ply 12. After screening, the frit is heated, or "fired", to melt the frit material and fuse it to the glass surface. Optionally, an opaque ceramic enamel border 42 (shown only in FIG. 2) may be applied on surface 20 of the glass ply 12 to hide the bus bars 22 and 24 and strips 32, 34, 33, and 40. The conductivity of the bus bars and conductive strips is chosen to be considerably greater than that of the coating 18 to provide a fairly even power distribution along the bus bar and prevent the bus bar from overheating.

Referring to FIG. 1, voltage sensor 44 includes an electroconductive line 46 which extends from the terminal area 36 at least around a portion of the perimeter of the windshield 10 within the uncoated marginal area. Sensor line 46 includes a connecting bridge 48 electrically interconnecting the line 46 with the upper bus bar 24 or a lead to power the line 46 from the upper bus bar 24. In the particular embodiment shown in FIG. 1, the line 46 is adjacent to the lead 30 and the connecting bridge 48 is at the juncture between bus bar 24 and strip 40. In operation, it is not necessary for the line 46 carry as much current as the bus bars or leads so that it may be thinner. Although not limiting in the present invention, the sensor line 46 and connecting bridge 48 are the same material as the bus bars and leads and are applied during the same silk screening operation.

With continued reference to FIG. 1, electrical lead 50 connects the lower bus bar 22 to one pole of an electrical power source 52. Leads 28 and 30 leading to the upper bus bar 24 are wired in common to the opposite pole of power source 52 by means of a jumper wire 54 and lead 56. Lead 56 is connected to a voltage comparator circuit 58 by wire 60. End 62 of the sensor line 46 at the terminal area 36 is connected to the comparator circuit 58 by wire 64.

In principle, the power discontinuity sensor of the present invention operates to detect a discontinuity, or break, in the strips 32, 34, 38, and 40 by comparing the voltage input from a power source to the upper bus bar 24 through the leads 28 and 30 to the voltage output from the sensor line 46. As discussed earlier, the double lead configuration to the upper bus bar 24 as shown in FIG. 1 allows one lead to break and still power the windshield 10 by directing the power through the remaining lead. The sensor line arrangement as taught in the present invention recognizes this advantage and will not interrupt power to the windshield 10 if only one of the leads is broken. When both leads are defective so that power no longer reaches the upper bus bar 24, the power builds up and tries to bridge the break in the lead, resulting in localized overheating due to the arcing that can damage the windshield 10. When power no longer reaches the upper bus bar 24, the measured voltage from the sensor line 46 which is powered from the bus bar 24 drops. This voltage drop is detected by a comparator circuit which in turn can generate a signal to alert the vehicle operator of the overheating condition and/or interrupt the power to the windshield 10. A break in either the upper bus bar 24 or lower bus bar 22 is not as critical as a break in the leads since both sides of the bus bar remain electrically interconnected by the electroconductive coating 18 so that there will be no arcing and associated overheating at the point of the break.

In operation, a reference voltage is provided to the comparator circuit 58 by lead 60 which is in common with the power source lead 56 and supplies power to the upper bus bar 24. The power flows through the strips 32, 34, 38, and 40, to the upper bus bar 24, through the coating 18 and to the lower bus bar 22. A portion of the power is directed to the sensor line 46 at the connecting bridge 48. The comparator circuit 58 continuously compares the reference voltage from the lead 56 to the measured voltage of the sensor line 46 from wire 64. When the measured voltage from the sensor line 46 differs from the reference voltage by a predetermined amount, indicating a break in a lead, an output signal from lead 66 of the comparator 58 is generated which will terminate the power being supplied to the windshield 10. Power is supplied to the sensor line 46 through two electroconductive paths and referring to the specific configuration of the sensor shown in FIG. 1, power is supplied through the lead 28 and upper bus bar 24 and through the lead 30. As a result if, for example, lead 28 breaks so that all the power to the upper bus bar 24 is supplied through lead 30, the measured voltage of the sensor lead 46 from wire 64 to the comparator 58 will not change appreciably because power will continue to be supplied to the sensor line 46 through lead 30 and the connecting bridge 48. As a result, the power discontinuity sensor will allow the windshield 10 to continue to function even though one of the leads to the upper bus bar 24 is inoperative. Conversely, if lead 30 fails, power will still be supplied to the upper bus bar 24 through lead 28 and power will be provided to the sensor line 46 through the lead 28 and bus bar 24. The power discontinuity sensor 44 shown in FIG. 1 will interrupt the power to the windshield 10 when both leads 28 and 30 are broken and no power reaches the upper bus bar 24. As a result of such a condition, power to the sensor line 46 is drastically reduced and the measured voltage from the sensor line 46 differs from the reference voltage by more than the predetermined amount, indicating that there is a break and potential for arcing and localized overheating within the windshield 10.

From the preceding discussion, it is clear that for voltage sensor 44 to function so that power to the double feed windshield 10 will be interrupted only when there is a defect in both leads 28 and 30, the electrical connection of the line 46 through the connecting bridge 48 should be made at a location such that those portions of the bus bar 24 and/or leads 28 and 30 which are to be monitored are between the power connection to the sensor 44, i.e., bridge 48, and the power connection to the leads, i.e., at terminal 36. In other words, bridge 48 is located downstream of both the power connection to the leads and the portions of the bus bar 24 and leads 28 and 30 which are being monitored for potential defects. More particularly, the connection is made to the bus bar 24 or to the juncture between one of the leads and the bus bar 24. If the connection was made at a location upstream from one of the potential defect areas, for example, at strip 34 of lead 30, a break in both the leads 28 and 30 would go undetected since power will still reach the sensor line 46 through the strip 34 and connecting bridge 48 and the signal to the comparator 58 will not drop so as to indicate that there is a potential for overheating due to arcing.

It is obvious that if the line 46 of the sensor 44 breaks, it is possible that the sensor will interrupt power to the windshield 10 even though it is still operational. For example, if a crack at the perimeter of the windshield 10 extends through the line 46, the comparator 58 will receive a voltage reading indicative of a break in both leads 28 and 30 even though one or both is still functional.

Figure 3:
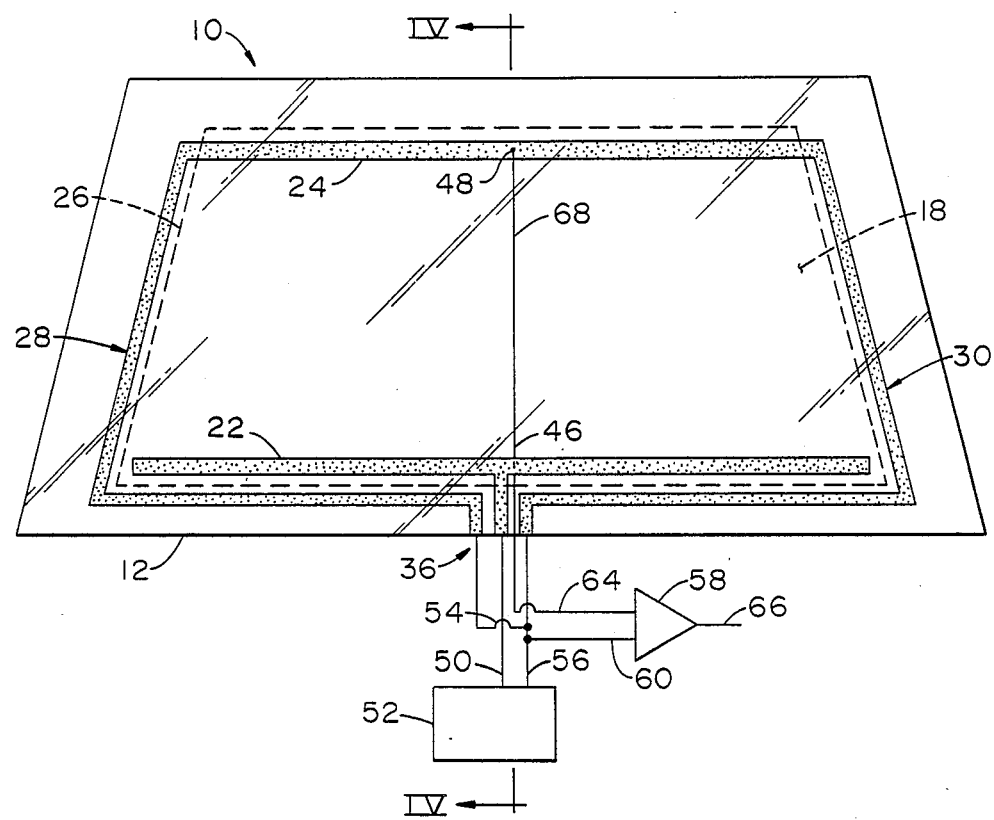
FIG. 3 is a schematic view of an alternate embodiment of the invention.
Figure 4:
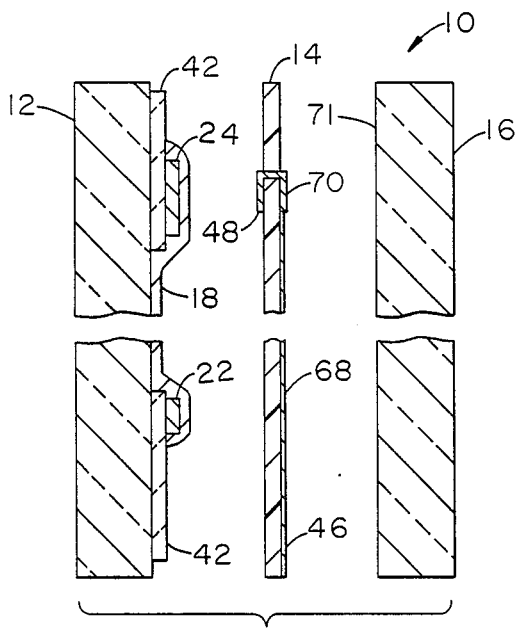
FIG. 4 is an exploded cross-sectional view taken along line IV—IV of FIG. 3, with portions removed for clarity.

The possibility of the sensor line 46 breaking due to a peripheral crack in glass ply 12 can be eliminated by removing the line from the surface 20 of the glass ply 12, as taught in U.S. patent application Ser. No. 267,403 to Carter et al., filed Nov. 4, 1988, which teachings are hereby incorporated by reference. More particularly, in the particular embodiment of the invention shown in FIGS. 3 and 4, sensor line 68 is a wire, preferably a 34 to 36 gauge iron nickel wire, embedded on or within the interlayer 14 in any convenient manner such as that disclosed in U.S. Pat. No. 4,078,107 to Bitterace et al, which teachings are hereby incorporated by reference, so that it is electrically insulated from the lower bus bar 22 and the electroconductive coating 18 by interlayer 14. Wire 68 is electrically connected to the upper bus bar 24 in any convenient manner. Although not limiting in the present invention, in the particular embodiment shown in FIGS. 3 and 4, connecting bridge 48 is a metal tab 70 (shown only in FIG. 4), extending through the interlayer 14 to interconnect the wire 68 with the upper bus bar 24. Although wire 68 in FIG. 3 extends across the windshield to the terminal area 36, it is obvious to one skilled in the art that the wire 68 may extend to any other edge of the windshield 10. Furthermore, the line sensor 44 can be an electroconductive ceramic frit or a conductive foil (both not shown) secured to surface 71 of inner glass ply 16.

Figure 5:
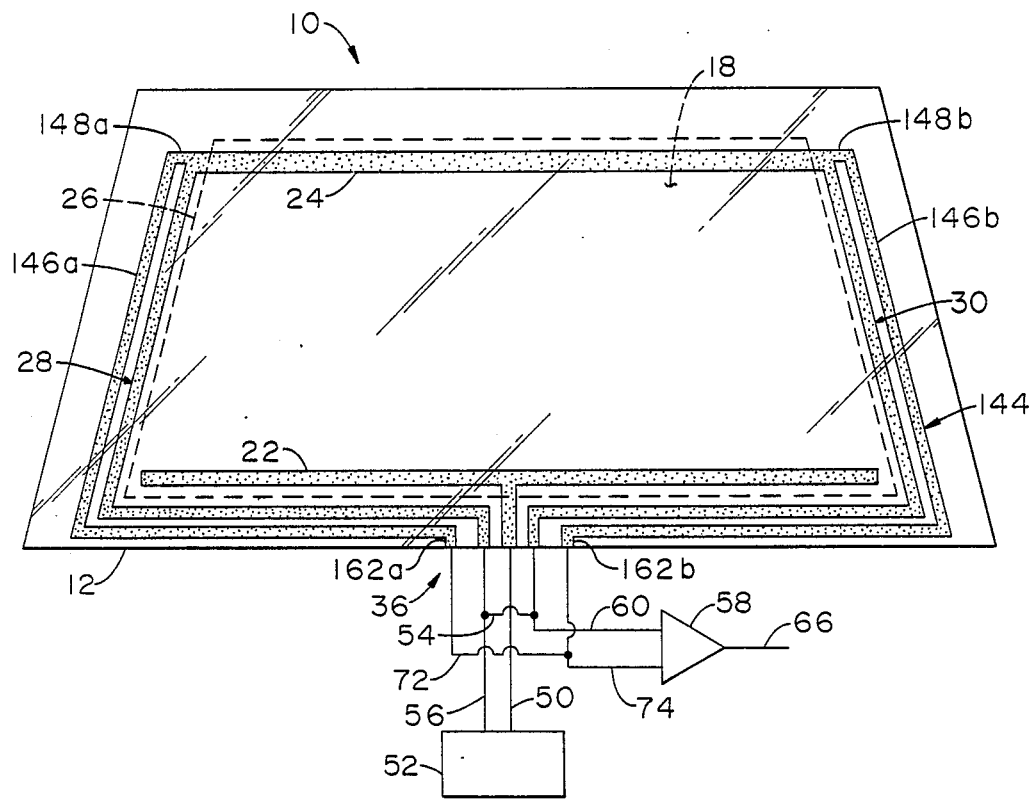
FIG. 5 is a schematic view of an additional embodiment of the invention.

The possibility of a defective or broken sensor line 46 giving an incorrect indication of the windshield 10's condition can also be reduced by adding a second sensor line. Referring to FIG. 5, voltage sensor 144 includes two separate lines 146a and 146b each connected at the juncture between the upper bus bar 24 and leads 28 and 30, respectively, via connecting bridges 148a and 148b, respectively. At terminal 36, ends 162a and 162b of lines 146a and 146b, respectively, are wired in common by jumper wire 72 connected by lead 74 to the comparator 58. With this sensor configuration, either of the lines 146a or 146b can become defective and the sensor 144 will operate to allow the windshield to function as discussed. For example, if lead 28 and line 146a are defective due to a crack at the edge of the windshield 10 while lead 30 is still functional, power is still provided to the bus bar 24 and the line 146b so that the sensor 144 will maintain the windshield 10's operability. When there is a defect in both leads 28 and 30 so that there is no power provided to the upper bus bar 24, the signal from the lines 146a and 146b will indicate the defective condition.

Figure 6:
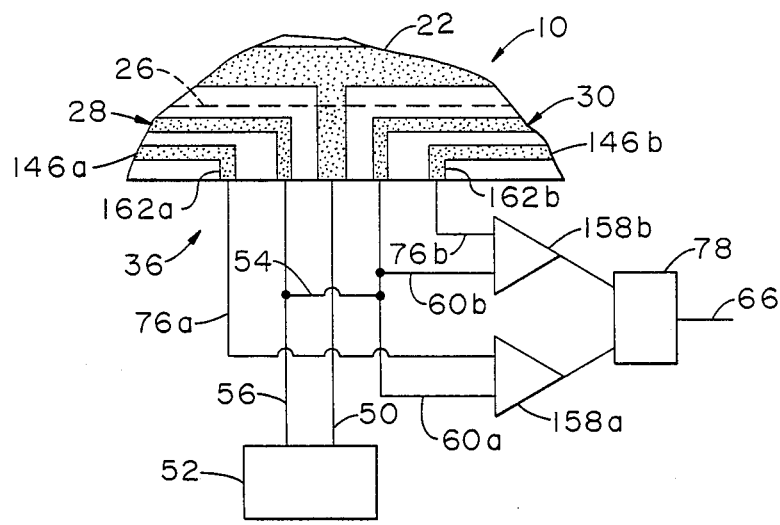
FIG. 6 is a schematic view of an alternate embodiment of the sensor circuitry shown in FIG. 5.

FIG. 6 shows an alternate embodiment of the comparator circuitry wherein a defect in either lead can be detected and indicated without interrupting the power to the windshield 10. End 162a of line 146a is connected by lead 76a to comparator 158a and end 162b of line 146b is connected by lead 76b to comparator 158b. Signals from comparators 158a and 158b are received by controller 78 which can interrupt current to the windshield 10 if both comparators indicate a break and a potentially damaging condition for the windshield 10. A break in either lead can be indicated to the vehicle operator in any convenient manner, for example a light. With this arrangement, a break in a bus bar or lead can be detected in an operating windshield 10 rather than requiring the windshield to become non-operative before the sensor indicates a power discontinuity or breakage.

Figure 7:
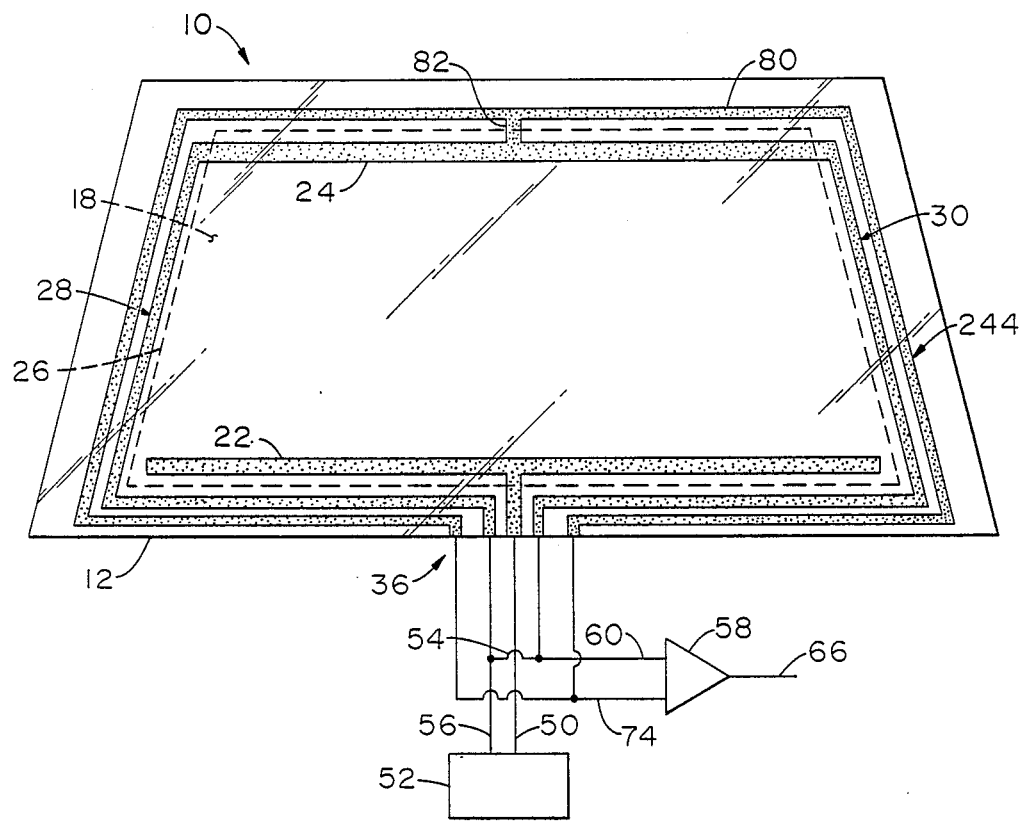
FIG. 7 is a schematic view of another embodiment of the invention.

FIG. 7 illustrates another embodiment of the invention. Sensor 244 includes a sensor line 80 extends continuously around the perimeter of the windshield 10, adjacent to the leads 28 and 30 and the upper bus bar 24. Connecting bridge 82 electrically interconnects the line 80 to the center of the upper bus bar 24 and the ends of the sensor line 80 at the terminal area 36 are connected to a comparator arrangement similar to that discussed earlier. The sensor arrangement shown in FIG. 7 is preferred where the windshield requirements necessitate detection of cracks about the perimeter of the windshield which extend through the line 80 even if they do not extend through the bus bars or leads so as to affect the power distribution to the windshield 10 since the operation of the sensor is based on monitoring variations in the voltage of the sensor line 80 rather than the voltage of a bus bar and/or leads.

While this invention has been described in detail with particular reference to a preferred embodiment thereof, it is understood that variations and modifications can be effected without departing from the scope of the invention as described hereinbefore and as defined in the following claims.

I claim:
1. An electrically heatable transparency comprising:
a non-electrically conductive substrate;
a first bus bar on a surface of said substrate;
a second bus bar on said surface of said substrate spaced from said first bus bar;
an electroconductive heating member on said substrate interconnecting said first and second bus bars;
first and second electroconductive leads electrically insulated from said electroconductive member and said second bus bar and each having a first end connected to said first bus bar and an opposing second end;
a sensor filament electrically insulated from said bus bars, leads, and electroconductive member to detect a power discontinuity in selected portions of said first bus bar and leads; and
means to electrically interconnect an end of said filament with said first bus bar or one of said leads at a location such that said selected portions are positioned between said interconnecting means and said second end of said lead.

2. An electrically heatable transparency comprising:
a non-electrically conductive substrate;
a first bus bar on a surface of said substrate;
a second bus bar on said surface of said substrate spaced from said first bus bar;
an electroconductive heating member on said substrate interconnecting said first and second bus bars;
first and second electroconductive leads electrically insulated from said electroconductive member and said second bus bar and each of said leads having a first end connected to said first bus bar;
at least one sensor filament electrically insulated from said bus bars, leads, and electroconductive member; and
means to electrically interconnect an end of said filament with said first bus bar or said first end of one of said leads.

3. The transparency as in claim 2 wherein said heating member is an electroconductive coating on said surface of said substrate, said first bus bar is positioned along a first marginal edge of said substrate in contact with said coating, said second bus bar is positioned along a second opposing marginal edge of said substrate in contact with said coating to pass a current from one of said bus bars through said coating to the other of said bus bars, and said first and second electroconductive leads extend along third and fourth edge portions of said substrate, respectively.

4. The transparency as in claim 3 wherein said substrate comprises a lamination of at least one glass sheet and at least one plastic sheet with said coating and said bus bars on said surface of said glass sheet and between said glass sheet and said plastic sheet, and further wherein at least a portion of said plastic sheet is positioned between said sensor filament and said electroconductive coating, said bus bars, and said leads to electrically insulate said filament.

5. The transparency as in claim 4 wherein said leads extend toward said second edge and at least one of said leads extends along said second edge.

6. The transparency as in claim 5 wherein said second bus bar, said leads, and said sensor filament are provided with terminal portions closely adjacent to each other along said second edge.

7. The transparency as in claim 6 further including means to measure voltage in said sensor filament and means responsive to variations in said measured voltage to interrupt current to said transparency.

8. The transparency as in claim 7 wherein said responsive means includes means to compare said measured voltage to a predetermined voltage and means to interrupt said current to said transparency in response to said comparing means when said measured voltage has a predetermined relationship relative to said predetermined voltage.

9. The transparency as in claim 2 wherein said sensor filament includes at least one sensor line on said surface of said substrate electrically insulated from said coating, adjacent to and extending along one of said first and second leads and further wherein said electrically interconnecting means connects said sensor line to said first bus bar or said first end of said adjacent electroconductive lead.

10. The transparency as in claim 2 wherein said sensor filament includes first and second sensor lines on the surface of said substrate electrically insulated from said coating, adjacent to and extending along said first and second leads, respectively, and further wherein said electrically interconnecting means connects each of said sensor lines to said first bus bar or said first end of said respective adjacent electroconductive leads.

11. The transparency as in claim 10 wherein said electrically interconnecting means includes first and second bridge members connecting an end of each of said sensor lines with said first and second ends of said first bus bar, respectively.

12. The transparency as in claim 10 wherein a portion of each of said first and second sensor lines extends along and is electrically insulated from said first bus bar.

13. The transparency as in claim 12 wherein said portion of said first and second sensor lines along said first bus bar is a single sensor line electrically interconnecting said first and second sensor lines and said electrically interconnecting means includes a bridge member connecting said single sensor line to a portion of said first bus bar intermediate its ends.

14. The transparency as in claim 10 wherein said leads and sensor lines extend toward said second edge and further wherein at least one of said leads and a corresponding adjacent sensor line further extends along said second edge.

15. The transparency as in claim 14 wherein said first and second leads and a corresponding adjacent first and second sensor lines further extend along said second edge.

16. The transparency as in claim 15 wherein said second bus bar, said leads, and said sensor lines are provided with terminal portions closely adjacent to each other along said second edge.

17. The transparency as in claim 16 further including means to measure voltage in said sensor lines and means responsive to variations in said measured voltage to interrupt current to said transparency.

18. The transparency as in claim 17 wherein said responsive means includes means to compare said measured voltage to a predetermined voltage and means to interrupt said current to said transparency in response to said comparing means when said measured voltage has a predetermined relationship relative to said predetermined voltage.

19. The transparency as in claim 18 wherein said voltage measuring means includes means to measure voltage in each of said sensor lines and said responsive means includes means to compare each of said measured voltages from said sensor lines to a predetermined voltage and means to interrupt said current to said transparency in response to said comparing means when both of said measured voltages have a predetermined relationship relative to said predetermined voltage.

20. The transparency as in claim 10 wherein said substrate comprises a lamination of at least one glass sheet and at least one plastic sheet wherein said coating, said bus bars, and said leads are between said glass sheet and said plastic sheet.

* * * * *